US011112817B2

(12) United States Patent
Leung et al.

(10) Patent No.: US 11,112,817 B2
(45) Date of Patent: Sep. 7, 2021

(54) CONTROL STICK

(71) Applicants: Defond Electech Co., Ltd., Dongguan (CN); Defond Components Limited, Chaiwan (HK)

(72) Inventors: Ka Him Leung, Dongguan (CN); Cheng Chen Nieh, Dongguan (CN); Cheong Yip Chan, Dongguan (CN)

(73) Assignees: Defond Electech Co., Ltd., Dongguan (CN); Defond Components Limited, Chaiwan (HK)

( * ) Notice: Subject to any disclaimer, the term of this patent is extended or adjusted under 35 U.S.C. 154(b) by 0 days.

(21) Appl. No.: 16/884,680

(22) Filed: May 27, 2020

(65) Prior Publication Data

US 2020/0379502 A1 Dec. 3, 2020

(30) Foreign Application Priority Data

May 29, 2019 (CN) ......................... 201910458053.0

(51) Int. Cl.
*G06F 3/033* (2013.01)
*G05G 9/047* (2006.01)

(52) U.S. Cl.
CPC ... *G05G 9/047* (2013.01); *G05G 2009/04722* (2013.01); *G05G 2009/04744* (2013.01)

(58) Field of Classification Search
USPC ......... 345/161, 156, 169; 200/511; 180/220; 428/156; 74/507
See application file for complete search history.

(56) References Cited

U.S. PATENT DOCUMENTS

| | | | | | |
|---|---|---|---|---|---|
| 4,511,769 | A * | 4/1985 | Sahakian | G05G 9/04785 | 200/511 |
| 5,724,068 | A * | 3/1998 | Sanchez, I | G05G 9/047 | 345/161 |
| 8,678,124 | B2 * | 3/2014 | Takenaka | B62K 11/00 | 180/220 |
| 2002/0190948 | A1 * | 12/2002 | Coutant | G05G 23/02 | 345/161 |
| 2003/0058220 | A1 * | 3/2003 | Wang | G05G 9/04796 | 345/161 |
| 2006/0279544 | A1 * | 12/2006 | Huang | G05G 9/04796 | 345/161 |
| 2007/0063974 | A1 * | 3/2007 | Slotta | G06F 3/0338 | 345/161 |
| 2007/0268251 | A1 * | 11/2007 | Edmunds | G05G 5/05 | 345/161 |

(Continued)

*Primary Examiner* — Thuy N Pardo

(57) ABSTRACT

A control stick includes a control portion, a first electrical contact portion and a second electrical contact portion. The control portion has plural first moving contact points, the first electrical contact portion has a control board and plural first static contact points corresponding to the first moving contact points respectively, and a gap exists between the first moving contact point and the respective first static contact point. The first static contact points are electrically connected with the control board. When the control portion swings towards one of the first moving contact points, the first moving contact point is contacted and conducted with the first static contact point. This control stick is capable of achieving the control of a multiple of variables to meet the requirements of controlling a multiple variable in some occasions.

8 Claims, 3 Drawing Sheets

(56) References Cited

U.S. PATENT DOCUMENTS

| | | | | |
|---|---|---|---|---|
| 2009/0084214 | A1* | 4/2009 | Sakai | A43B 21/42<br>74/471 XY |
| 2010/0124634 | A1* | 5/2010 | Slotta | G06F 3/0338<br>428/156 |
| 2011/0240454 | A1* | 10/2011 | Ohshima | G05G 9/047<br>200/6 A |
| 2012/0260760 | A1* | 10/2012 | Terao | G05G 9/047<br>74/471 XY |
| 2012/0260763 | A1* | 10/2012 | Terao | G05G 1/08<br>74/507 |
| 2017/0001106 | A1* | 1/2017 | Gassoway | A63F 13/24 |
| 2017/0304717 | A1* | 10/2017 | Huang | G06F 3/0338 |
| 2018/0095548 | A1* | 4/2018 | Strahle | G06F 3/033 |
| 2018/0149012 | A1* | 5/2018 | Dwars | G01L 3/00 |
| 2018/0174783 | A1* | 6/2018 | Wu | A63F 13/24 |
| 2019/0138044 | A1* | 5/2019 | Slotta | G05G 1/06 |
| 2020/0379501 | A1* | 12/2020 | Sirohiwala | G05G 1/04 |
| 2020/0406131 | A1* | 12/2020 | Benson | A63F 13/24 |

* cited by examiner

CONTROL STICK

FIELD OF THE INVENTION

The present invention relates to the field of electronic switches, and more particularly to a control stick.

BACKGROUND OF THE INVENTION

Control stick is a multi-degree-of-freedom (MDOF) control component capable of achieving different control effects by applying forces in different directions to the control stick. Most conventional control sticks just have the function of a single-variable control only. In other words, the control stick can be controlled by pushing, but a multi-variable control cannot be implemented. Therefore, these conventional control sticks are inconvenient in some occasions that require the multi-variable control.

SUMMARY OF THE INVENTION

In view of the aforementioned drawbacks and deficiencies of the prior art, it is a primary objective of the present invention to provide a control stick capable of achieving the multi-variable control to meet the requirements for the multi-variable control in some occasions.

To achieve the aforementioned and other objectives, the present invention discloses a control stick comprising a control portion, a first electrical contact portion and a second electrical contact portion, characterized in that the control portion has a plurality of first moving contact points, and the first electrical contact portion comprises a control board and a plurality of first static contact points corresponding to the first moving contact points respectively, and a gap exists between the first moving contact point and the respective first static contact point; the plurality of first static contact points is electrically coupled to the control board, and when the control portion swings in a direction towards one of the first moving contact points, the first moving contact point is contacted and conducted with the first static contact point; and the bottom of the control portion is penetrated through the first electrical contact portion and has a second moving contact point, and the second electrical contact portion comprises a second static contact point corresponding to the second moving contact point, and a gap exists between the second moving contact point and the second static contact point, and when the control portion is pressed, the second moving contact point is contacted and conducted with the second static contact point.

Wherein, the control portion comprises an upper control module and a lower control module, and the plurality of first moving contact points is disposed at the upper control module, and the second moving contact point is disposed at the lower control module; and when the upper control module swings in a direction towards one of the first moving contact points, the first moving contact point is contacted with the first static contact point; and when the upper control module is pressed, the upper control module presses at the lower control module, so that the second moving contact point is contacted with the second static contact point.

Wherein, the upper control module comprises a knob control stick, a shaft, a housing, a ring-shaped elastic member and a plurality of contact plates, and the first moving contact points are disposed at the bottom of the contact plate and a chute is disposed at the top of the shaft, and the knob control stick is slidably coupled to an inner sidewall of the chute; an arc portion is disposed at the bottom of the shaft, and the housing has an arc chamber for receiving the arc portion; and the arc portion has a cavity therein, and the chute is communicated with the cavity, and an opening is formed at the bottom of the arc portion and provided for passing the knob control stick; when the knob control stick is pressed, the knob control stick passes through the opening presses at the lower control module; the housing has a plurality of yield slots formed around the periphery of the arc chamber, and the bottom of the contact plate is pivotally coupled to the inner sidewall of the yield slot; the top of the arc chamber has a ring-shaped slot extending outwardly, and the ring-shaped elastic member is received into the ring-shaped slot, and the ring-shaped elastic member presses at the top of the contact plate.

Wherein, an elastic reset member is installed between the knob control stick and the shaft.

Wherein, the upper control module further comprises a bottom casing for placing the control board, and the housing is covered onto the bottom casing.

Wherein, the upper control module further comprises a silicone cover, and the silicone cover is covered onto the top of the housing, and the knob control stick is penetrated through the silicone cover and coupled to the silicone cover.

Wherein, an elastic overload member is installed between the first moving contact point and the contact plate.

Wherein, the lower control module comprises a pressing structure pressing at the moving touch plate disposed at the bottom of the pressing structure and provided for the pressing structure to restore the elastic pressing member, and the second moving contact point is disposed at the bottom of the moving touch plate, and the moving touch plate is conducted with the second moving contact point.

The present invention has the following advantageous effects:

The control stick of this invention has the effect of controlling a multiple of variables, and the control portion of the control stick can be pushed to allow the first moving contact point and the first static contact point to be contacted and conducted with each other, and the first moving contact point is conducted with the control board which is a circuit having a certain control effect, and the control board is externally connected to an electric device to achieve the single variable control of the electric device. In addition, the control portion can be pressed to drive the second moving contact point and the second static contact point to be contacted and conducted with each other, and the second static contact point is externally connected to another electric device to achieve the single variable control of another electric device. The present invention controls two variables separately to meet the requirement of controlling a multiple of variables in some occasions.

The technical characteristics of the present invention will become apparent with the detailed description of preferred embodiments accompanied with the illustration of related drawings as follows.

BRIEF DESCRIPTION OF NUMERALS USED IN THE DRAWINGS

Figure 1:
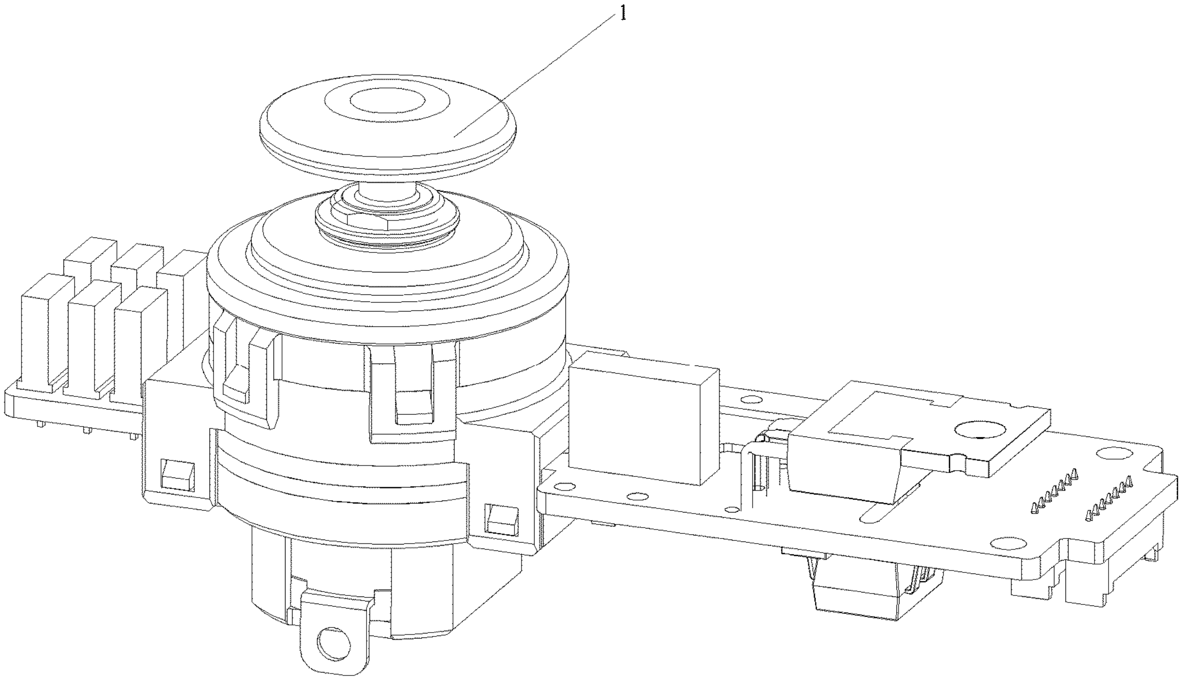
FIG. 1 is a perspective view of the present invention.

1: Control portion; 11: First moving contact point; 12: Second moving contact point; 13: Upper control module;

131: Knob control stick; 132: Shaft; 1321: Chute; 1322: Arc portion; 1323: Cavity; 1324: Opening; 133: Housing; 1331: Arc chamber; 1332: yield slot; 1333: ring-shaped slot; 134 ring-shaped elastic member; 135: contact plate; 136: elastic reset member; 137: bottom casing; 138: silicone cover; 139: elastic overload member; 14 Lower control module; 141: Pressing structure; 142: moving touch plate; 143: elastic pressing member; 2: First electrical contact portion; 21: Control board; 22: First static contact point; 3: Second electrical contact portion; 31: Second static contact point.

DESCRIPTION OF THE PREFERRED EMBODIMENTS

The method of implementing the present invention is illustrated by the specific embodiments as follows, and the persons having ordinary skill in the art can easily understand other advantages and effects of the present invention from the content disclosed in this specification. The present invention can also be implemented by other specific embodiments and details of this specification can also be based on different viewpoints and applications, and various modifications or changes can be made without departing from the spirit of the present invention.

It is noteworthy that the structures shown in the drawings of the present invention are only used to match the contents disclosed in the specification and provided for those having ordinary skill in the art to understand and read, but not intended for limiting the scope of the present invention, so that these structures shown in the drawings substantially have no specific technical significance and any modification or adjustment of the structures without affecting the effects and purposes of the present invention should still fall within the scope of the technical contents disclosed by the invention.

Figure 2:
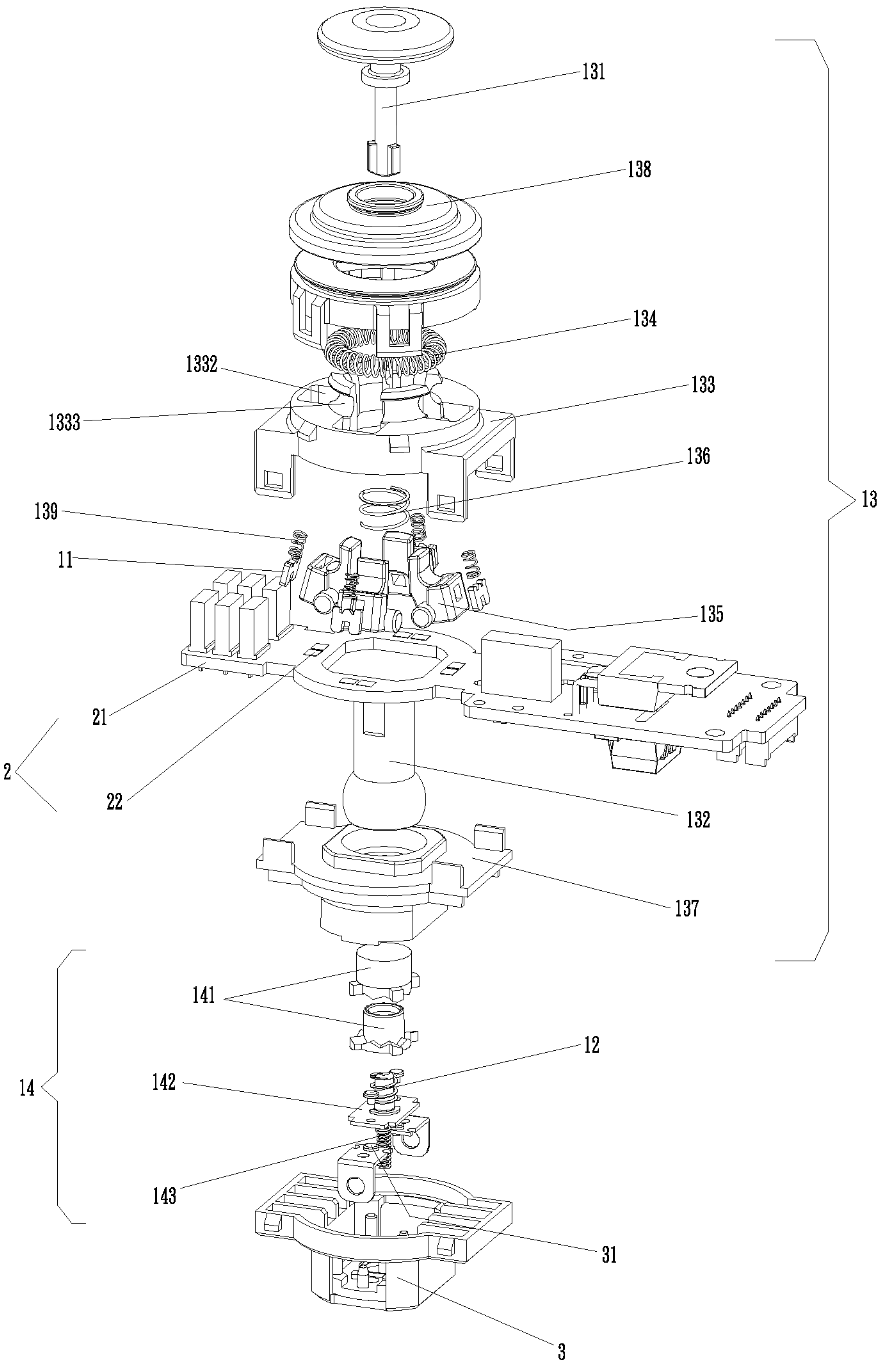
FIG. 2 is an exploded view of the present invention.
Figure 3:
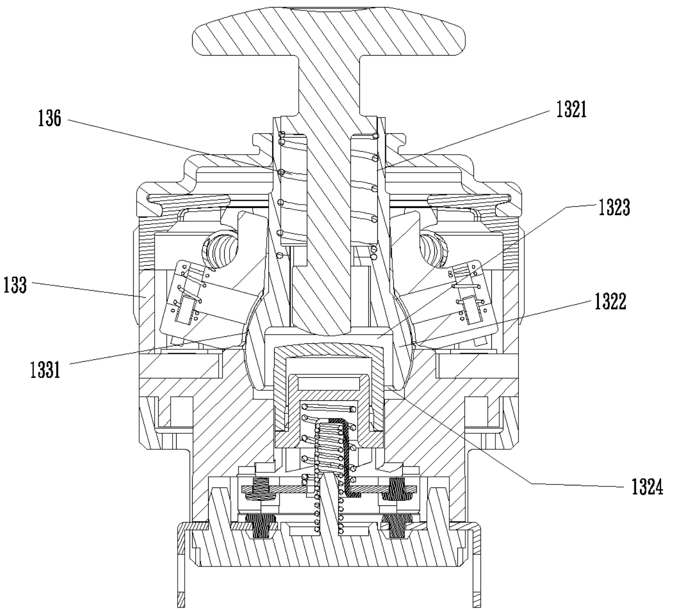
FIG. 3 is a cross-sectional view of the present invention.

With reference to FIGS. 1 to 3 for a control stick of the present invention, the control stick comprises a control portion 1, a first electrical contact portion 2 and a second electrical contact portion 3, characterized in that the control portion 1 has a plurality of first moving contact points 11, and the first electrical contact portion 2 comprises a control board 21 and a plurality of first static contact points 22 corresponding to the first moving contact points 11 respectively, and a gap exists between the first moving contact point 11 and the respective first static contact point 22; the plurality of first static contact points 22 is electrically coupled to the control board 21, and when the control portion 1 swings in a direction towards one of the first moving contact points 11, the first moving contact point 11 and the first static contact point 22 are contacted and conducted with each other; the bottom of the control portion 1 is penetrated through the first electrical contact portion 2 and has a second moving contact point 12, and the second electrical contact portion 3 comprises a second static contact point 31 corresponding to the second moving contact point 12, and a gap exists between the second moving contact point 12 and the second static contact point 31; when the control portion 1 is pressed, the second moving contact point 12 and the second static contact point 31 are contacted and conducted with each other.

The control stick of this invention provides the effect of a multi-variable control, and the control portion 1 of the control stick can be pushed to allow the first moving contact point 11 and the first static contact point 22 to be contacted and conducted with each other, and the first moving contact point 11 is conducted with the control board 21 which is a circuit having a certain control effect, and the control board 21 is externally connected to an electric device to achieve the single variable control of the electric device. In addition, the control portion 21 can be pressed to drive the second moving contact point 12 and the second static contact point 31 to be contacted and conducted with each other, and the second static contact point 31 is externally connected to another electric device to achieve the single variable control of another electric device. The present invention controls two variables separately to meet the requirement of controlling a multiple of variables in some occasions.

In a preferred embodiment, the control portion 1 comprises an upper control module 13 and a lower control module 14, and the first moving contact points 11 are disposed at the upper control module 13, and the second moving contact points 12 are disposed at the lower control module 14; when the upper control module 13 swings in a direction towards one of the first moving contact points 11, the first moving contact point 11 and the respective first static contact point 22 are contacted with each other; and when the upper control module 13 is pressed, the upper control module 13 presses at the lower control module 14 to drive the second moving contact point 12 and the second static contact point 31 to be contacted with each other.

Specifically, the upper control module 13 comprises a knob control stick 131, a shaft 132, a housing 133, a ring-shaped elastic member 134 and a plurality of contact plates 135, and the first moving contact points 11 are disposed at the bottom of the contact plate 135; the top of the shaft 132 has a chute 1321, and the knob control stick 131 is slidably coupled to an inner sidewall of the chute 1321; the bottom of the shaft 132 has an arc portion 1322, and the housing 133 has an arc chamber 1331 for receiving arc portion 132, and the arc portion 1322 and the arc chamber 1331 of this embodiment are preferably spherical structures; the arc portion 1322 has a cavity 1323 formed therein, and the chute 1321 is communicated with the cavity 1323, and the bottom of the arc portion 1322 has an opening 1324 provided for passing and inserting the knob control stick 131; when the knob control stick 131 is pressed, the knob control stick 131 passes through the opening 1324 and presses at the lower control module 14; the housing 133 has a plurality of yield slots 1332 formed around the periphery of the arc chamber 1331, and the bottom of the contact plate 135 is pivotally coupled to an inner sidewall of the yield slot 1332; the top of the arc chamber 1331 has a ring-shaped slot 1333 extending outwardly and accommodated in the ring-shaped slot 1333, and the ring-shaped elastic member 134 presses at the top of the contact plate 135.

It is noteworthy that the arc portion 1322 of this embodiment is preferably a spherical portion, and the arc chamber 1331 is preferably a spherical chamber. The present invention may be implemented by other methods and modifications and variations could be made thereto by those skilled in the art without departing from the scope and spirit of the invention as set forth in the claims.

In the aforementioned solution, the knob control stick 131 is switched in a direction towards one of the first moving contact points 11, so that the knob control stick 131 drives the shaft 132 to press the contact plate 135, and the contact plate 135 passes through the yield slot 1332 and moves in a direction towards the corresponding first static contact point 22, and the first moving contact point 11 moves near the first static contact point 22 and finally touches the first static contact point 22; after the first moving contact point 11 touches the first static contact point 22, the first moving contact point 11 is conducted with the corresponding control circuit of the first static contact point 22, and the control board 21 is externally connected to the electric device for the control of the electric device; when the first moving contact point 11 and the first static contact point 22 are contacted with each other, the contact plate 135 will press the ring-shaped elastic member 134; the ring-shaped elastic member 134 is compressed to produce an elastic force, so that when a user releases the knob control stick 131, the elastic force produced by the ring-shaped elastic member 134 will return the contact plate 135 to its original position, so as to separate the first moving contact point 11 from the first static contact point 22 and release the control of the control circuit to the external electric device. Similarly, this operating principle applies to other contact plates 135, and the principle thus will not be repeated.

Specifically, the upper control module 13 further comprises a bottom casing 137 for placing the control board 21, and the housing 133 is covered onto the bottom casing 137, and the bottom casing 137 has the effect of carrying the control board 21.

Specifically, the upper control module 13 further comprises a silicone cover 138, and the silicone cover 138 is covered onto the top of the housing 133, and the knob control stick 131 is penetrated through the silicone cover 138 and coupled to the silicone cover 138. When the knob control stick 131 is switched, a displacement with a certain distance is produced, and the silicone cover 138 is deformed with the knob control stick 131 to provide the effect of sealing the interior of the control stick when the knob control stick 131 is switched.

Specifically, an elastic overload member 139 is installed between the first moving contact point 11 and the contact plate 135. During the process of the first moving contact point 11 touching the first static contact point 22 and the contact plate 135 continuing its rotation, the first moving contact point 11 drives the elastic overload member 139 to be compressed. Without the elastic overload member 139, the first moving contact point 11 will press too hard on the first static contact point 22 to damage the first static contact point 22.

Specifically, the lower control module 14 comprises a pressing structure 141 pressing the moving touch plate 142 at the bottom of the pressing structure 141 and an elastic pressing member 143 provided for resuming the pressing structure 141, and the second moving contact point 12 is disposed at the bottom of the moving touch plate 142, and the moving touch plate 142 and the second moving contact point 12 are conducted with each other.

In the aforementioned solution, the operating principle of the pressing structure 141 is the same as that of the conventional pen-type pressing structure 141, and both of these structures press the top of the pressing structure 141, so that the abutment of the pressing structure 141 with the pen at the bottom is achieved by the propping of the moving touch plate 142 of this invention and maintained in this way until the pressing structure 141 is pressed again, and the elastic pressing member 143 in the pressing structure 141 elastically resuming the pressing structure 141 to its original position to abut the pen at the bottom can be achieved by withdrawing the moving touch plate 142 in this invention. Similarly, a user presses the pressing structure 141 to prop out the moving contact plate in this embodiment, so that the second moving contact point 12 and the second static contact point 31 are contacted with each other, and the moving contact plate is maintained in this status until the user presses the pressing structure 141 again, and the pressing structure 141 ends its action of propping the moving contact plate. Under the effect of the elastic pressing member 143, the pressing structure 141 resumes its original status. It is noteworthy that we can refer to the prior art on the way how the pressing structure 141 props the moving contact plate and the way how the elastic pressing member 143 resumes the pressing structure 141 to its original status, and thus they will not be repeated.

Specifically, an elastic reset member 136 is installed between the knob control stick 131 and the shaft 132 and provided for pressing the knob control stick 131 to return to its original position elastically.

It is noteworthy that the ring-shaped elastic member 134, the elastic reset member 136 of this embodiment is preferably a spring coil spring, and the elastic pressing member 143 and the elastic overload member 139 of this embodiment are preferably springs. The aforementioned elastic components of the present invention can be implemented by other methods. As long as an elastic component (such as a spring plate) can be recovered from their deformation, such elastic component can be used as a substitute part of this invention.

While the invention has been described by means of specific embodiments, numerous modifications and variations could be made thereto by those skilled in the art without departing from the scope and spirit of the invention as set forth in the claims.

What is claimed is:

1. A control stick, comprising: a control portion (1), a first electrical contact portion (2) and a second electrical contact portion (3), characterized in that the control portion (1) has a plurality of first moving contact points (11), and the first electrical contact portion (2) comprises a control board (21) and a plurality of first static contact points (22) corresponding to the first moving contact points (11) respectively, and a gap exists between the first moving contact point (11) and the respective first static contact point (22); the plurality of first static contact points (22) is electrically coupled to the control board (21), and when the control portion (1) swings in a direction towards one of the first moving contact points (11, the first moving contact point (11) is contacted and conducted with the first static contact point (22); and the bottom of the control portion (1) is penetrated through the first electrical contact portion (2) and has a second moving contact point (12), and the second electrical contact portion (3) comprises a second static contact point (31) corresponding to the second moving contact point (12), and a gap exists between the second moving contact point (12) and the second static contact point (31), and when the control portion (1) is pressed, the second moving contact point (12) is contacted and conducted with the second static contact point (31).

2. The control stick as claimed in claim 1, wherein the control portion (1) comprises an upper control module (13) and a lower control module (14), and the plurality of first moving contact points (11) is disposed at the upper control module (13), and the second moving contact point (12) is disposed at the lower control module (14); and when the upper control module (13) swings in a direction towards one of the first moving contact points (11), the first moving contact point (11) is contacted with the first static contact point (22); and when the upper control module (13) is pressed, the upper control module (13) presses at the lower control module (14), so that the second moving contact point (12) is contacted with the second static contact point (31).

3. The control stick as claimed in claim 2, wherein the upper control module (13) comprises a knob control stick (131), a shaft (132), a housing (133), a ring-shaped elastic member (134) and a plurality of contact plates (135), and the first moving contact points (11) are disposed at the bottom of the contact plate (135) and a chute (1321) is disposed at the top of the shaft (132), and the knob control stick (131) is slidably coupled to an inner sidewall of the chute (1321); an arc portion (1322) is disposed at the bottom of the shaft (132), and the housing (133) has an arc chamber (1331) for receiving the arc portion (1322); and the arc portion (1322) has a cavity (1323) therein, and the chute (1321) is communicated with the cavity (1323), and an opening (1324) is formed at the bottom of the arc portion (1322) and provided for passing the knob control stick (131); when the knob control stick (131) is pressed, the knob control stick (131) passes through the opening (1324) presses at the lower control module (14); the housing (133) has a plurality of yield slots (1332) formed around the periphery of the arc chamber (1331), and the bottom of the contact plate (135) is pivotally coupled to the inner sidewall of the yield slot (1332); the top of the arc chamber (1331) has a ring-shaped slot (1333) extending outwardly, and the ring-shaped elastic member (134) is received into the ring-shaped slot (1333), and the ring-shaped elastic member (134) presses at the top of the contact plate (135).

4. The control stick as claimed in claim 3, further comprising an elastic reset member (136) installed between the knob control stick (131) and the shaft (132).

5. The control stick as claimed in claim 3, wherein the upper control module (13) further comprises a bottom casing (137) for placing the control board (21), and the housing (133) is covered onto the bottom casing (137).

6. The control stick as claimed in claim 3, wherein the upper control module (13) further comprises a silicone cover (138), and the silicone cover (138) is covered onto the top of the housing (133), and the knob control stick (131) is penetrated through the silicone cover (138) and coupled to the silicone cover (138).

7. The control stick as claimed in claim 3, further comprising an elastic overload member (139) installed between the first moving contact point (11) and the contact plate (135).

8. The control stick as claimed in claim 2, wherein the lower control module (14) comprises a pressing structure (141) pressing at the moving touch plate (142) disposed at the bottom of the pressing structure (141) and provided for the pressing structure (141) to restore the elastic pressing member (143), and the second moving contact point (12) is disposed at the bottom of the moving touch plate (142), and the moving touch plate (142) is conducted with the second moving contact point (12).

* * * * *